United States Patent [19]
Wong

[11] Patent Number: 4,821,799
[45] Date of Patent: Apr. 18, 1989

[54] GREASE INJECTION CONTROL SYSTEM

[75] Inventor: Kwok-Ping Wong, The Colony, Tex.

[73] Assignee: Otis Engineering Corporation, Dallas, Tex.

[21] Appl. No.: 192,670

[22] Filed: May 10, 1988

[51] Int. Cl.⁴ .................... E21B 33/072; F16J 15/40
[52] U.S. Cl. .................................... 166/84; 166/77; 166/90; 166/385; 184/15.2; 277/19; 277/72 FM
[58] Field of Search ............ 166/84, 90, 53, 77, 166/70, 385, 75.1, 86, 88; 277/19, 72 FM, 59, 28, 29; 184/15.1, 15.2

[56] References Cited

U.S. PATENT DOCUMENTS

| | | | |
|---|---|---|---|
| 2,670,225 | 2/1954 | McKinney | 277/19 X |
| 2,674,474 | 4/1954 | Lister | 166/84 |
| 2,893,515 | 7/1959 | Schweisthal | 184/15.2 |
| 3,209,830 | 10/1965 | Orr et al. | 166/88 X |
| 4,090,573 | 5/1978 | Rankin | 277/72 FM X |
| 4,476,924 | 10/1984 | Winders et al. | 166/84 |
| 4,489,780 | 12/1984 | Duhon | 166/70 |

FOREIGN PATENT DOCUMENTS

| | | | |
|---|---|---|---|
| 0715770 | 2/1980 | U.S.S.R. | 166/90 |
| 0147568 | 4/1981 | U.S.S.R. | 277/72 FM |

*Primary Examiner*—Stephen J. Novosad
*Attorney, Agent, or Firm*—Roland O. Cox

[57] ABSTRACT

A system for sealing around a wireline run into or pulled from wells includes a grease control head with a line wiper mounted on the well head and a grease injection control system. The grease injection control system supplies grease continuously at a constant pressure for injection into the grease control head. The control system utilizes a piston pump to supply grease to a grease chamber in a pressurizing accumulator. The accumulator has another chamber connected to a remote pressure source, which is separated from the grease chamber by a moveable partition. Constant pressure from the remote source is transmitted through the moveable partition to grease in the grease chamber maintaining a constant pressure on grease injected into the grease control head. The sealing system is provided with a conduit to return injected grease pumped through the grease head to a waste grease reservoir for disposal. This conduit includes a valve which may be closed to aid in reestablishing a blownout grease seal.

17 Claims, 1 Drawing Sheet

GREASE INJECTION CONTROL SYSTEM

BACKGROUND OF THE INVENTION

1. Technical Field

The present invention concerns a grease injection system for sealing around flexible wireline while performing wireline service operations in a well. The invention specifically concerns an injection system in which the grease is continuously injected at a constant pressure into a grease control head.

2. Description of the Related Art

When using a grease control head, grease or high viscosity fluid is pumped or injected into the control head to lubricate the line running through the control head and to form a pressure barrier in the very close clearance between tubes in the control head and wireline running through the tubes. The barrier prevents pressured fluids from escaping from the well around the wireline.

The quantity of grease injected must be sufficient to maintain the pressure barrier and replace any grease carried out of the control head by clinging to the line when running line through the control head. Pressure on the grease must be above pressure in the well before grease can be injected into the control head.

Reciprocating piston pumps are usually used to inject grease directly into control heads. These pumps are equipped with discharge pressure limit switches set at a range of about 1000-2000 psi above well pressure and must be capable of producing discharge pressures of over 15,000 psi if the well pressure is in the 13,000 to 14,000 psi range. When the piston pump is running, and the wireline is not running through the control head, the quantity of grease discharged from the pump and injected will be more than the quantity of grease needed when the line is being run through the control head. Part of the excess injected grease will flow downwardly inside the control head into the well and part of the grease flows upwardly and out of the control head. Grease flowing out of the control head is usually conducted into a waste grease reservoir for disposal.

When the discharge pressure controlled pump is not running and line is running through the control head, grease is being carried out on the line and not replaced. When enough grease is carried away, pressure in the well will blowout the insufficient grease barrier and leakage will occur around the line.

As the dichsarge pressure of a piston pump fluctuates from a low on the suction stroke to a high on the discharge stroke, well pressure may blowout the grease barrier from the control head if injection pressure falls below well pressure long enough when the piston pump is on the suction stroke, and well pressure will leak around the line.

SUMMARY OF THE INVENTION

The grease injection control system of this invention provides a system wherein grease for injection is supplied continuously at a substantially constant pressure to the control head. A high pressure piston pump pumps grease from a reservoir through a grease chamber in a pressurizing accumulator to a grease control head on a well. The accumulator has a pressurizing chamber connected to a remote source of pressured gas. The pressurizing chamber is separated from the grease chamber in the accumulator by a moveable partition in the form of pistons, a floating piston or a diaphragm sealed in the accumulator. Constant pressure from the remote source and/or force from a resilient bias is continuously transmitted through the partition to grease in the grease chamber. When pistons connected with a rod are used, the ratio of the piston diameters may be varied to increase or decrease pressure transmitted to the grease. Check valves may be in the conduits between the piston pump and accumulator grease chamber and accumulator grease chamber and grease control head to prevent backflow of pumped and pressured grease. A resilient wiper for wiping grease from the wireline as it runs through the control head is mounted on the control head. The invention system includes a conduit for conducting grease pumped through the control head back to a waste grease reservoir. There is a valve in this conduit which may be closed to aid in reestablishing the grease barrier after blowout.

A principal object of this invention is to provide an improved grease injection system wherein the grease may be continuously injected into a grease control head.

An object of this invention is to provide an improved grease injection system wherein grease may be continuously injected at a constant pressure into a grease control head.

An object of the present invention is to provide an improved grease injection system having a pressuring accumulator in which pressure transmitted to the grease may be more or less than gas pressure supplied to the accumulator.

An object of this invention is to provide an improved grease injection system wherein grease may be injected continuously at constant pressure into a control head and grease pumped through the control head is conducted to a waste grease reservoir.

Also an object of the present invention is provide an improved grease injection system having a valve in the conduit from the grease control head to the waste grease reservoir which may be closed to aid in replacing a blown out grease seal.

DESCRIPTION OF THE DRAWINGS

FIG. 1 shows a well having a casing 10 in a hole bored in the earth. Mounted on the well casing is a wellhead 11 on which is mounted a lubricator section 12. Mounted on the lubricator section is a grease control head 14. The control head has a number of internal tubes 14a and a conduit 15 is connected to the control head to supply pressured grease for injecting into the control head tubes and around a wireline 16 passed through the tubes. Mounted on the control head is a wiper retainer 17 with a resilient wiper 17a. A conduit 18 having a valve 18a therein is connected to the control head to conduct grease from the control head to a waste grease reservoir 19.

Figure 1:
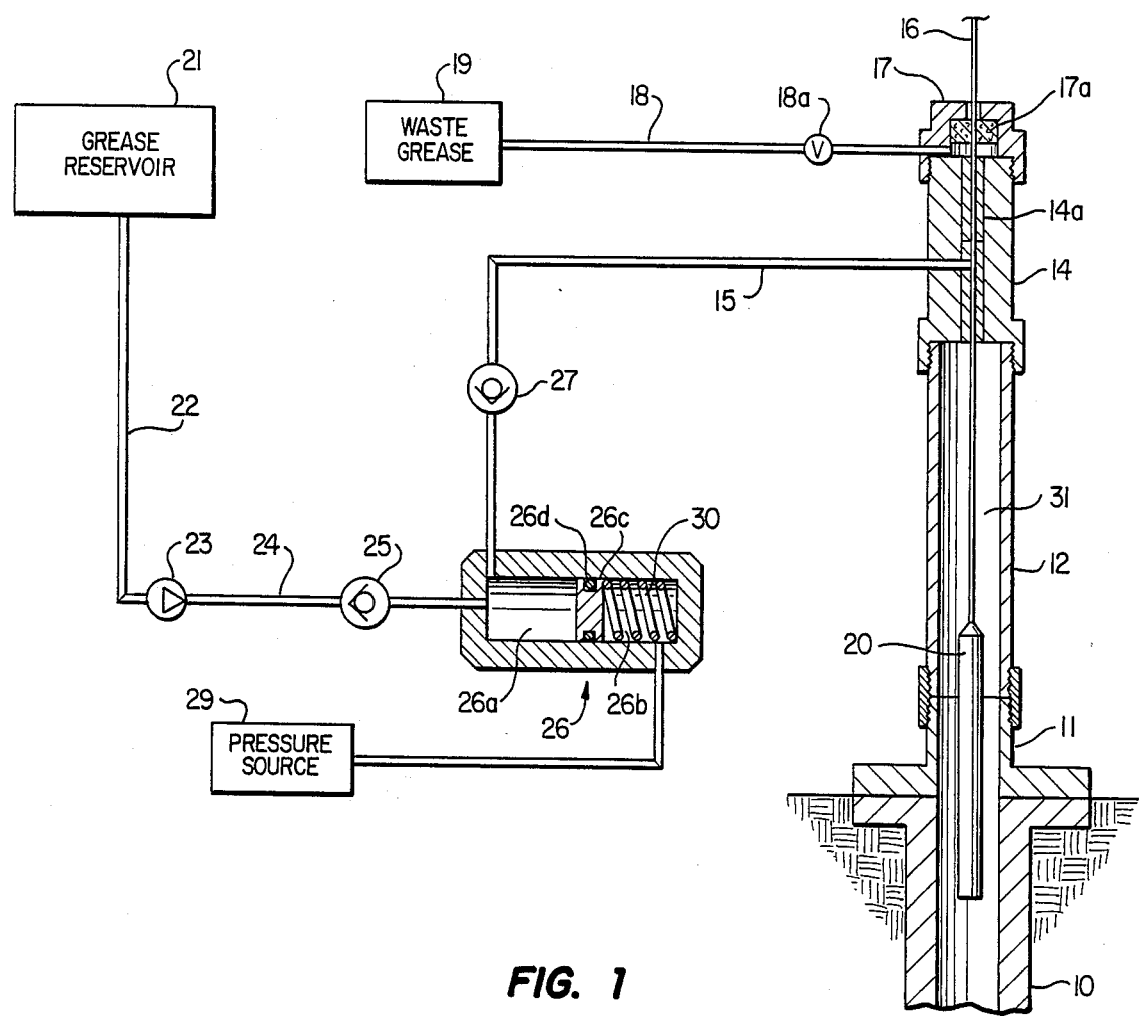
FIG. 1 is a schematic drawing of the grease injection control system of this invention utilizing a pressurizing accumulator having a floating piston.

There is a string of wireline tools 20 connected to the wireline. The wireline is connected to a wireline unit (not shown), which lowers and raises the wireline and tools to perform servicing operations in the well.

The grease injected into the control head is taken from the grease reservoir 21 through conduit 22 by piston pump 23 and pumped into conduit 24. A check valve 25 is in conduit 24 between the piston pump and a pressurizing accumulator 26. This accumulator has a variable volume pressure chamber 26a into which grease is pumped through conduit 24. This chamber has an outlet to conduit 15. A check valve 27 is in conduit 15 between the grease chamber 26a and control head 14.

Within accumulator 26 is another variable volume pressure chamber 26b. This chamber has an inlet for conduit 28, which is connected to a remote source of pressured gas 29 such as a pressurized gas bottle or pressure from the well bore. Hydraulic pressure could be used in chamber 26b, but it would not provide the cushioning effect within the system that gas does.

Figure 2:
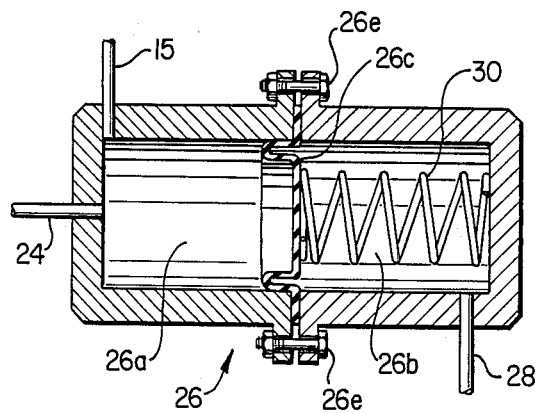
FIG. 2 is a schematic drawing of a pressurizing accumulator having a diaphragm.
Figure 3:
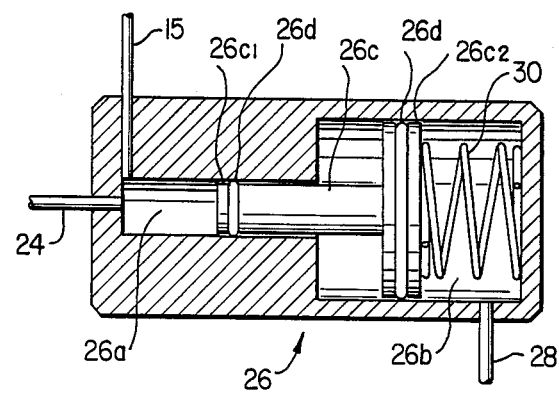
FIG. 3 is a schematic drawing of a pressuring accumulator having two pistons of different diameters connected by a rod.

Chambers 26a and 26b are pressure separated within the accumulator by a moveable partition 26c in the form of a floatiing piston shown in FIG. 1, a flexible diaphragm shown in FIG. 2 or a pair of pistons connected by a rod shown in FIG. 3. The floating piston and pistons are slidably sealed in the accumulator with resilient seals 26d. The flexible diaphragm form of moveable partition 26c is sealed to the accumulator by tightening bolts 26e shown in FIG. 2. Chamber 26b may also include a resilient bias 30. By varying the ratio of the diameters of the moveable partition pistons 26c1 and 26c2 shown in FIG. 3, pressure transmitted to the grease in chamber 26a from chamber 26b may be more or less than the pressure equivalent force of spring 30 and/or pressure in line 28. The larger diameter piston in chamber 26b as shown in FIG. 3 results in a higher pressure on grease in chamber 26a.

When wireline service operations are being performed in a well and the wireline is being lowered and raised through the grease control head 14, well pressure 31 in the well is prevented from leading around the wireline through the grease control head to atmosphere by the grease barrier in the control head. Wiper 17a wipes the wireline clean and prevents release of low pressure waste grease into the atmosphere. Sufficient grease must be continuously injected to provide a grease barrier of sufficient length around the wireline in the control head tubes to contain pressure 31 in the well.

Grease in conduit 15 is continuously maintained at a constant pressure above well pressure for injected flow into control head tubes 14a by sufficient constant resilient bias 30 on moveable partition 26c and/or continuous application of a constant pressure in conduit 28.

If the grease barrier around the wireline is blown out of tubes 14a, valve 18a should be closed to prevent any of the grease injected from flowing through the control head into the waste grease reservoir. More grease will be retained in the grease control head and sufficient grease barrier column length to prevent well pressure leakage around the wireline will be quickly reestablished.

I claim:

1. A system for sealing around a flexible line lowered into or raised from a well having a wellhead comprising:
   (a) a grease control head mounted on the wellhead; and
   (b) a control system for grease injected into said control head, said control system including a pump for pumping grease and a pressurizing accumulator for continuously maintaining a constant pressure on said grease.

2. The system of claim 1 including a waste grease reservoir and a conduit for conducting injected grease pumped through the control head to said reservoir.

3. The system of claim 2 further including a valve in the conduit conducting grease from the control head to the waste grease reservoir.

4. A system for continuous injection of grease at a constant pressure into a grease control head mounted on a wellhead comprising:
   (a) pumping means for pumping grease from a grease reservoir;
   (b) pressurizing accumulator means for imparting constant and continuous pressure to the grease;
   (c) said grease control head having an inlet and an outlet for grease; and
   (d) conduits for conducting grease from said pumping means through said accumulator means to said control head inlet;
   (e) a waste grease reservoir; and
   (f) a conduit for conducting grease from said control head outlet to said waste grease reservoir.

5. The system of claim 4 including a valve in the conduit conducting waste grease from the control head to the waste grease reservoir.

6. The system of claim 4 wherein the conduit from the pumping means to the accumulator means has a check valve therein permitting grease to flow from said pumping means to said accumulator means, said check valve preventing flow from said accumulator means to said pumping means.

7. The system of claim 4 wherein the conduit from the accumulator means to the grease control head has a check valve therein, permitting grease to flow from said accumulator means to said grease control head, said check valve preventing flow from said grease control head to said accumulator means.

8. The system of claim 4 wherein the pumping means is a piston type pump.

9. The system of claim 4 wherein the pressurizing accumulator means comprise:
   (a) a first chamber means for grease;
   (b) a second chamber means for applying continuous pressure on the grease; and
   (c) moveable partition means between said first and second chamber means for continuously transmitting pressure from said second chamber means to grease in said first chamber means.

10. The system of claim 9 wherein the first chamber means comprise:
    (a) a variable volume pressure chamber within the accumulator;
    (b) an inlet into said chamber for admitting grease from the pumping means; and
    (c) an outlet from said chamber for discharging grease into the control head.

11. The system of claim 9 wherein the second chamber means comprise:
    (a) a variable volume pressure chamber within the accumulator; and
    (b) an inlet into said chamber for admitting pressure from a remote pressure source.

12. The system of claim 11 wherein the second chamber means further includes a resilient bias in the chamber.

13. The system of claim 9 wherein the moveable partition means is a piston slidably sealed in the accumulator.

14. The system of claim 9 wherein the moveable partition means is a diaphragm sealed in the accumulator.

15. The system of claim 9 wherein the moveable partition means comprise:
   (a) a piston slidably sealed in the first chamber means;
   (b) a piston slidably sealed in the second chamber means; and
   (c) a rod connecting said pistons.

16. The system of claim 15 wherein the piston in the first chamber means is larger than the piston in the second chamber means.

17. The system of claim 15 wherein the piston in the first chamber means is smaller than the piston in the second chamber means.

* * * * *